US011908348B2

(12) United States Patent
Knight

(10) Patent No.: US 11,908,348 B2
(45) Date of Patent: Feb. 20, 2024

(54) NOVELTY DISPLAY PLATFORM

(71) Applicant: Aisha Ruth Knight, Laguna Niguel, CA (US)

(72) Inventor: Aisha Ruth Knight, Laguna Niguel, CA (US)

(73) Assignee: Aisha Ruth Knight, Laguna Niguel, CA (US)

( * ) Notice: Subject to any disclaimer, the term of this patent is extended or adjusted under 35 U.S.C. 154(b) by 0 days.

(21) Appl. No.: 17/831,758

(22) Filed: Jun. 3, 2022

(65) Prior Publication Data

US 2023/0395002 A1 Dec. 7, 2023

(51) Int. Cl.

*G09F 13/24* (2006.01)
*G09F 19/02* (2006.01)
*F21V 9/12* (2006.01)
*F21S 10/00* (2006.01)
*F21W 121/00* (2006.01)

(52) U.S. Cl.

CPC ............ *G09F 13/24* (2013.01); *F21S 10/002* (2013.01); *F21V 9/12* (2013.01); *G09F 19/02* (2013.01); *F21W 2121/00* (2013.01)

(58) Field of Classification Search

CPC ........ G09F 13/24; G09F 19/02; F21S 10/002; F21V 9/12

See application file for complete search history.

(56) References Cited

U.S. PATENT DOCUMENTS 5,416,994 A * 5/1995 McLaughlin ........... G09F 13/24 40/406
5,967,639 A * 10/1999 Shih .......................... B44C 5/00 362/101
2002/0073585 A1* 6/2002 Burnett ................... G09F 13/24 40/406
2002/0118531 A1* 8/2002 Yang ......................... B44C 5/00 362/86
2005/0201081 A1 9/2005 Brady
2006/0133064 A1* 6/2006 Lin ....................... F21S 10/002 362/101
2009/0255155 A1* 10/2009 James ..................... G09F 19/02 40/406
2010/0276508 A1* 11/2010 Davies ................ F21V 23/0435 239/18
2016/0186939 A1* 6/2016 Ho ...................... F21V 33/0028 362/101
2017/0011672 A1* 1/2017 Chakravartula ........ G09F 13/24
2021/0060450 A1 3/2021 Guarino

FOREIGN PATENT DOCUMENTS

WO 2019/118467 A1 6/2019

* cited by examiner

*Primary Examiner* — Gary C Hoge
(74) *Attorney, Agent, or Firm* — Irell and Manella LLP

(57) ABSTRACT

The NOVELTY DISPLAY PLATFORM discloses a display platform for illuminating a display chamber. The platform includes a base unit containing a light source. The base unit is configured with a stage to support a display chamber. The base unit further includes an opening configured to receive a light conduit. The light conduit is configured to redirect light from the light source contained in the base unit to illuminate the display chamber. The display chamber may contain a transparent sheet bearing an image and/or be filled with a suspension of reflective particles. The a light source may be color changing and/or support various display modes, and may be controlled by a remote.

19 Claims, 6 Drawing Sheets

NOVELTY DISPLAY PLATFORM

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations address novelty displays, including novelty lamps for illuminating an image for display.

BACKGROUND

Lamps and illuminated displays have been developed to serve various purposes, such as illumination and decoration. Some lamps focus to a greater degree on providing practical illumination, for example as a nightlight where only minimal illumination is required. Others serve a primarily decorative purpose, such as by illuminating colored globules in an immiscible combination of liquids in novelty lamps colloquially termed "lava lamps." The lamps generally draw power from a wall outlet, but may also be battery powered.

SUMMARY

Embodiments of the present innovations relate to novelty display platforms for illuminating a display chamber. In some implementations, the display platform may comprise a base unit containing a light source and providing a stage for supporting a display chamber. The base unit may be further configured to receive a light conduit that redirects light from inside the device base unit to illuminate the display chamber. Both the display chamber and light conduit may integrate and/or combine with the base unit. Various implementations of the display chamber may contain a transparent sheet including one or more images, e.g., with at least some portions permeable to light, so that the image is effectively illuminated from behind, and is thus well visible through the far side of the display chamber. In some implementations, display chambers are not integrated with the base unit, so that the base unit and light conduit can illuminate a variety of display chambers each containing a different image for display by removing one display chamber from the stage and replacing it with another. In some implementations, the front of the base may be equipped to mount interchangeable plaques, such as to bear logos corresponding to the images in display chambers. Additionally in some embodiments, the light conduit may comprise an acrylic light-diffusing panel configured to evenly illuminate a display chamber with diffuse light, e.g., via a frosted region. In various implementations, the light source in the base may allow for variable lighting effects, such as color changing, dimming, strobe effects, ultraviolet illumination, and/or the like, which effects may be remotely controllable.

BRIEF DESCRIPTION OF THE DRAWINGS

The accompanying appendices and/or drawings illustrate various non-limiting, example, innovative aspects in accordance with the present descriptions.

DETAILED DESCRIPTION OF DRAWINGS

Figure 1:
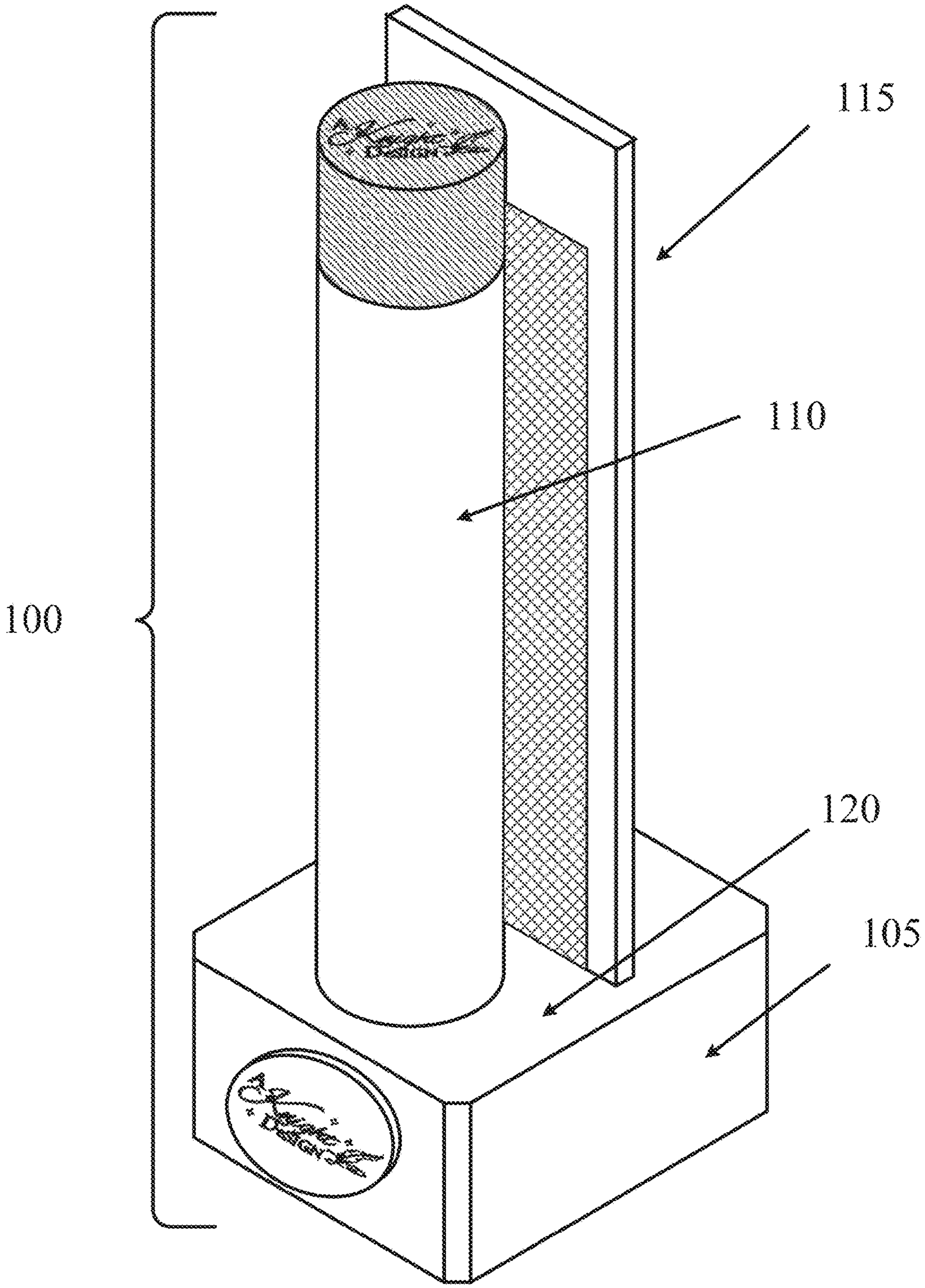
FIG. 1 is a perspective drawing of an assembled display platform including a base unit, cylindrical display chamber and light conduit comprising a light diffusing panel according to some embodiments disclosed herein.

FIG. 1 illustrates an embodiment of the display platform 100 that includes a base unit 105 containing a light source, a display chamber 110, and a light conduit 115. In this embodiment, the light conduit comprises a light diffusing panel 115 that slots into and stands, e.g., substantially perpendicular, to the top panel 120 of the base unit 105. In some implementations, the top panel 120 may serve as a stage on which the display chamber 110 stands. Other embodiments comprise a base unit 105 configured to interface with a display chamber 110 and light conduit 115 even if not actually integrated or combined with the display chamber or light conduit.

Figure 2:
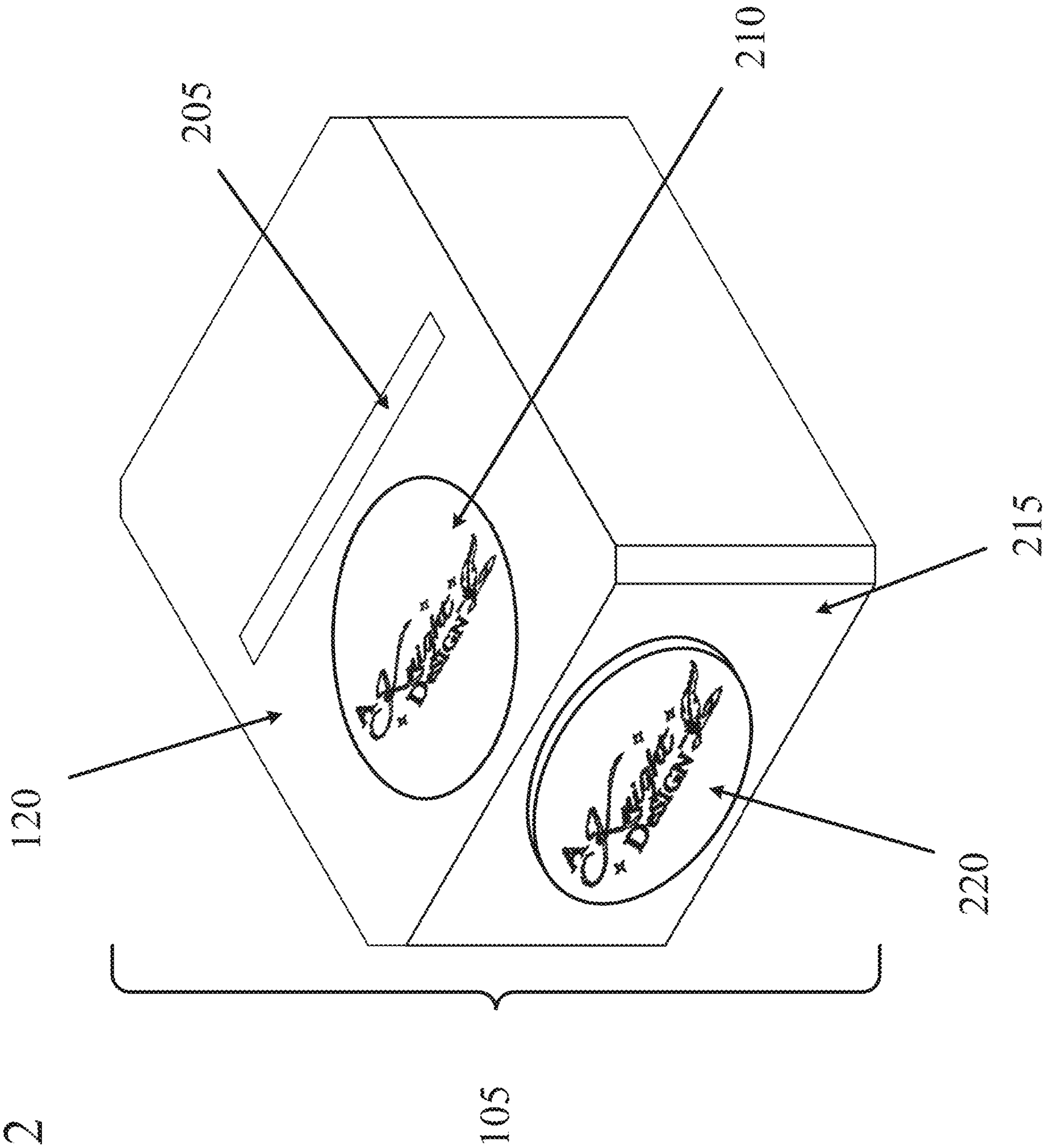
FIG. 2 is a perspective drawing of a base unit alone, according to some embodiments disclosed herein.

FIG. 2 illustrates the base unit 105 separately in one embodiment. In some implementations, the base unit 105 may comprise a hollow right prism of a rectangle with its corners cut off, although numerous other shapes and/or sizes may be employed according to other implementations. The base unit 105 may contain a light source, such as colored light-emitting diodes which may be controlled, e.g., by remote in a particular implementation. Many other light sources could be used: with varying modes of illumination, incandescent, fluorescent and/or the like; in various color schemes, monochromatic, statically or dynamically multicolored, ultraviolet illumination, and/or the like; and controlled in various ways, by buttons electrically connected to the light source, touch pad, touch screen, voice activation, clap activation, mobile phone control, pre-programmable and/or user-programmable light sequences, and/or the like. The top panel 120 includes an opening 205 configured to receive a light conduit 115. In one implementation, the opening 205 is an elongated slot. In one implementation, a portion of the top panel 120 may serve as a stage for standing a display chamber. For example, an etched circle 210 may mark the position to stand a display chamber 110 in this implementation, or top of the base unit 105 may have a curved channel configured to receive a cylindrical display chamber 110 lying on its side. In other implementations, the display chamber 110 may interface with the base unit 105 in different ways. For example, the base unit 105 and display chamber 110 may be configured to couple mechanically one to the other, may be configured to be held together by magnetic attraction, e.g., via one or more magnets in the base unit 105 and/or display chamber 110, and/or the like.

In one implementation, the front panel 215 may include a plaque 220 that bears a logo. The plaque 220 may include one or more magnets configured to attach to the front panel 215 by magnetic attraction, for example by including corresponding magnets in or on the front panel 215, or by making a portion of the front panel 215 out of a ferromagnetic material. The plaque may attach to the front panel 215 in a variety of different ways, for example a peg on its back configured to fit in a hole included on the front panel 215. A feature of this configuration is that the front plaque 220 is exchangeable for other plaques, e.g., to correspond to the various themes of the interchangeable display chambers 110. In other implementations, the base unit 105 may include an aroma release facility (e.g., a heating element and aroma source container to release aromas by essential oil diffusion, melting aromatic wax, and/or the like), sound effects, alarms, music playback, and/or the like. These effects may or may not be synchronized or coordinated in various ways with the illumination of the, for example patterns of flashing light corresponding to the beat of music.

Figure 3:
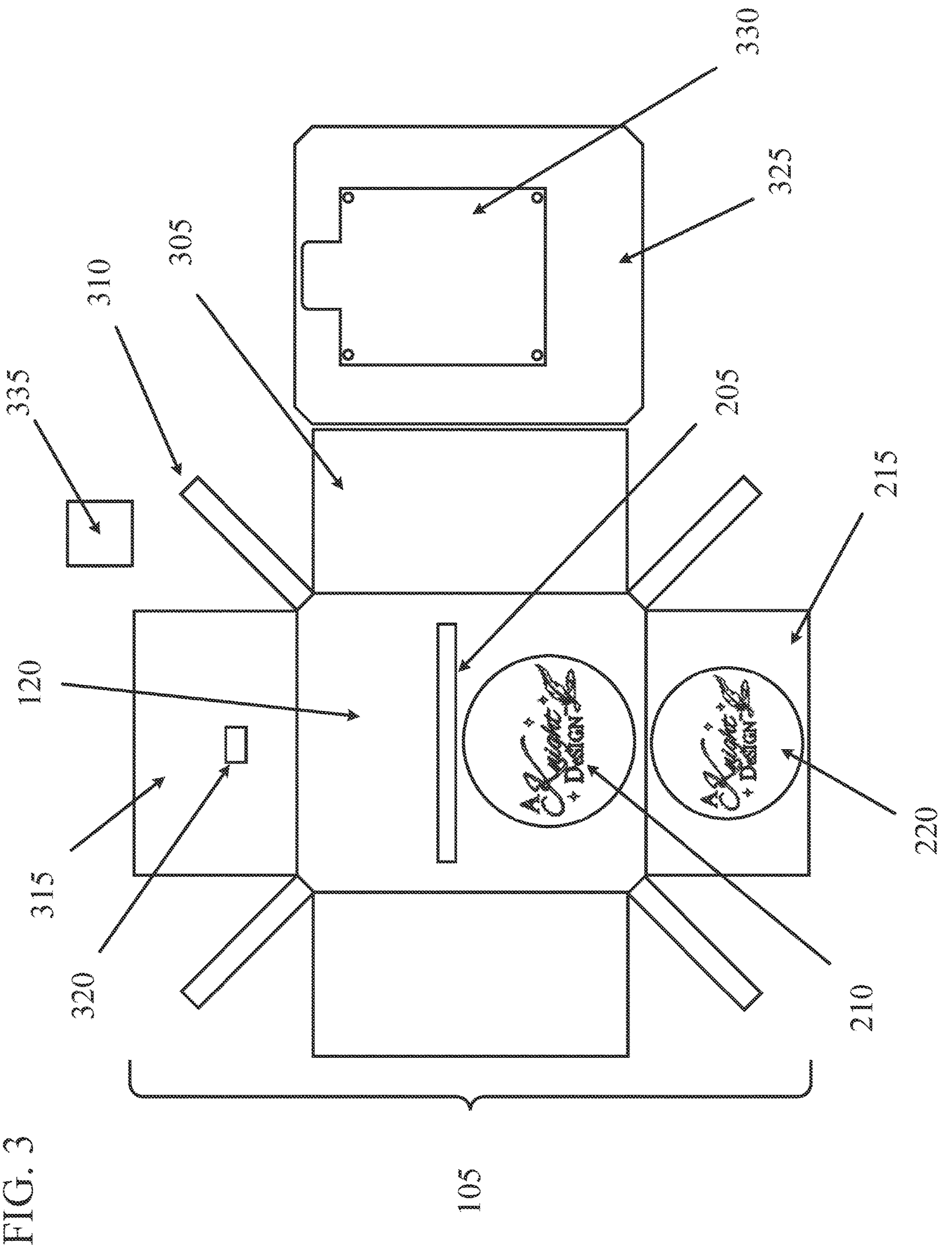
FIG. 3 depicts a base unit unfolded to show constituent panels, according to some embodiments disclosed herein.

FIG. 3 depicts a base unit 105 unfolded into constituent panels. In this embodiment, the base unit has two side panels 305 and four corner panels 310. The rear panel has an opening 320 through which a power cable passes. This power cable powers a light source 335 when inserted into a power outlet, but the light source 335 is also configured to draw power from a disposable battery when no power is provided by the power cable. In other embodiments, the light source 335 may be configured to draw power exclusively from the power cable without any battery, or the power cable may be configured to charge a rechargeable battery contained in the base unit 105, which battery is configured to provide power to the light source even when no power is provided by the power cable. In other embodiments, the light source may be configured to produce light in a different manner, allowing a rear opening and cable to be excluded, such as exclusively by battery power for example, by using a nonelectric light source 335, and/or the like. Additionally in one embodiment, the bottom panel 325 includes a removable panel 330 that allows access to the interior of the base unit 105 including the light source 335 contained within. In alternative embodiments, the base unit may comprise a different number and arrangement of constituent panels to accommodate different folded configurations (e.g., cylindrical, octagonal, hexagonal, pentagonal, non-regular geometric shapes, and/or the like).

Figure 4:
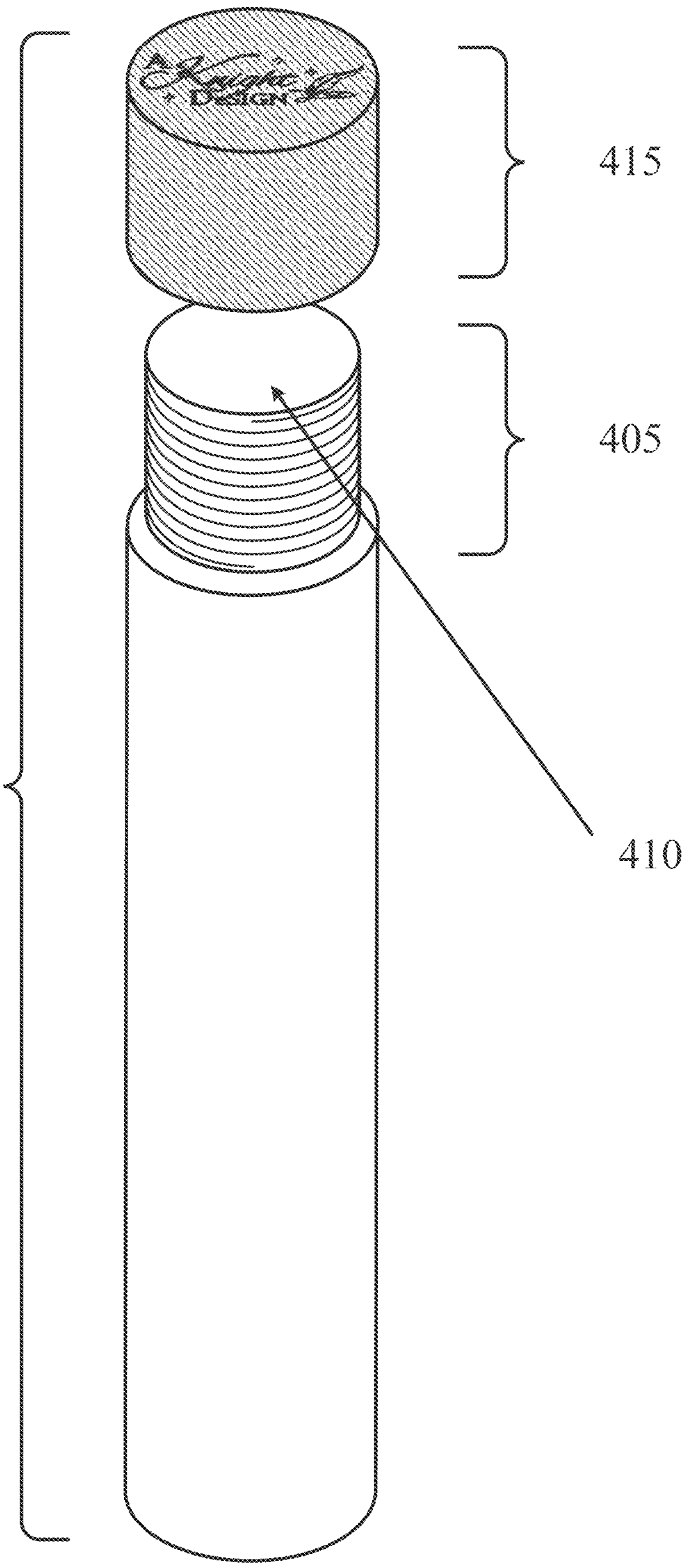
FIG. 4 is a perspective drawing of a cylindrical display chamber, disassembled to show the cap and chamber separately, according to some embodiments disclosed herein.

FIG. 4 is a perspective drawing of a cylindrical display chamber 110. In one embodiment, the display chamber 110 is a cylinder with a necked-down and threaded portion 405 at one end (e.g., the top). The top end may also have an opening 410 where the top side of a cylinder would be. In this embodiment, a screw-on cap 415 is affixed via the threading on the necked-down portion 405. The cap 415 may be etched with a logo or other image on its top surface, or may have a plaque attached to the top surface. The display chamber 110 may take a variety of other shapes and/or sizes in different embodiments, for example elongated rectangular prisms, cubes, spheres, conical or modified conical shapes, and/or the like. In some implementations, the display chamber 110 may be filled with a mixture of water and a thickening agent such as polyvinyl alcohol. The fluid may further contain glitter, sequins, and/or similar reflective or non-reflective particles, including in shapes made to match a particular theme, which may be put into suspension by shaking the display chamber 110. The viscosity of the fluid may be modulated by using various concentrations of polyvinyl alcohol or other thickening agents, which may have various advantages, e.g., higher viscosity fluids holding particles in suspension for longer. Additionally, glitter particles and/or the like may be kept in suspension by a stirring and/or vibration feature in the base unit 105, by a magnetic stir bar in the display chamber 110 moved by a rotating magnetic field from the base unit 105, and/or the like. In other embodiments, the display chamber 110 may be filled with water alone, a dyed aqueous mixture, other liquid, air, other gasses or fluids, and/or the like. In some implementations, the display chamber 110 is colorless and transparent to allow an image 505 to be viewed through the side of the chamber. Such a display chamber 110 may be made out of plastic, glass, or other transparent or semi-transparent materials.

Figure 6:
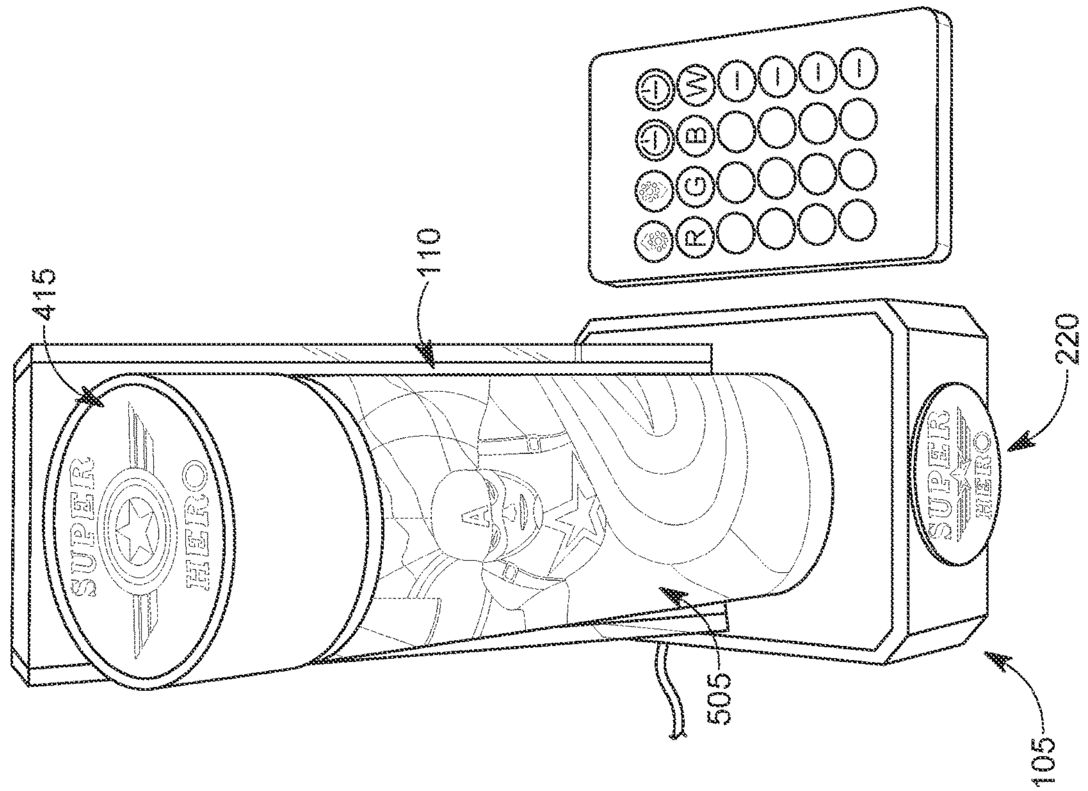
FIG. 5 and FIG. 6 are greyscale photographs of an embodiment of an assembled a display platform alongside a remote control (the Marvel logo, the Captain America logos, and the image of Captain America are all property of Marvel Entertainment LLC).
Figure 5:
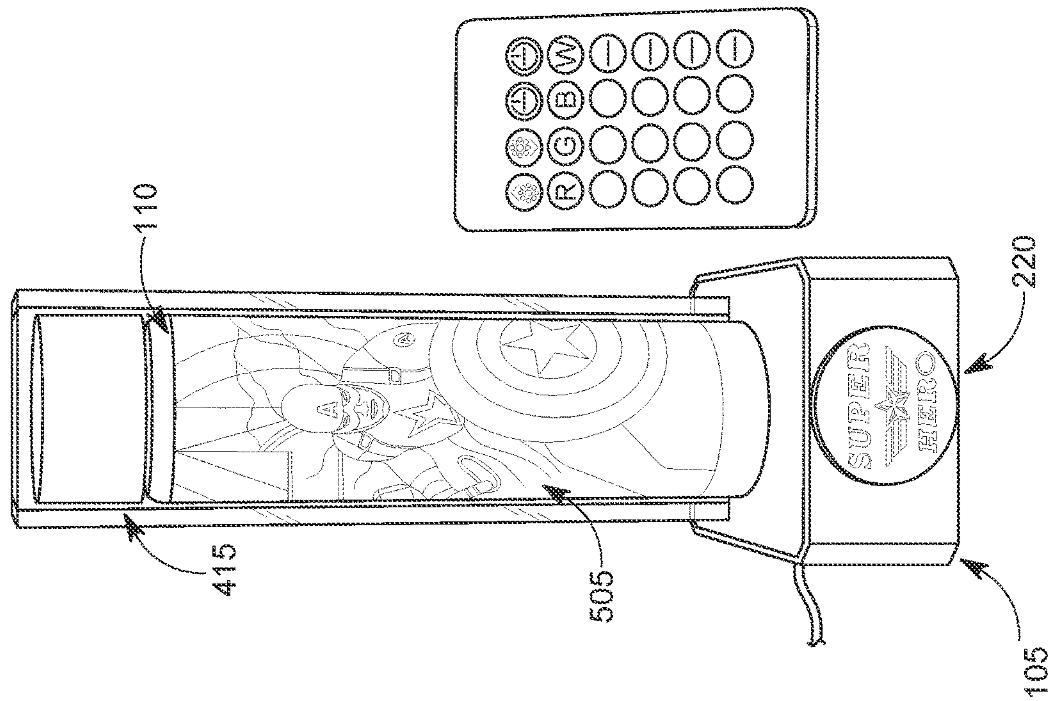

In one implementation, a transparent or semi-transparent sheet bearing an image may be contained within the display chamber 110. The image may be arranged on the transparent sheet to be viewed in landscape orientation, portrait orientation, or arranged in any other way. The transparent sheet may take a variety of shapes and be configured to be inserted into the display chamber 110 in a variety of orientations. The image 505 may be in multiple colors, including colored transparent or semi-transparent portions, to allow the image 505 to be illuminated for display from behind with light passing through some or all of it. In this embodiment, the portion of the display chamber 110 wall opposite to this image 505 is transparent and colorless to allow the image to be viewed through the display chamber 110. In one embodiment, the display chamber 110 may remain un-attached to the base unit 105. A feature of this embodiment is that display chambers 110 with different images 505 may be exchanged on the display chamber stage. The image 505 may be produced by various techniques and in various media. For example, the image 505 may be laser cut out of a metallic medium, laser cut out of other media, printed in ink on the transparent sheet, printed as a lenticular image that appears to transform as the viewing angle changes or as a holographic print giving an illusion of three dimensions, and/or the like. One example of a display platform 100 arranged in this way is depicted in FIGS. 5 and 6.

In another implementation, an image 505 may be printed or otherwise produced directly on the surface of the display chamber 110. In different embodiments, a display platform 100 could illuminate images from other directions, using other types of light conduit 115, such as to display opaque images as well. In other implementations, the display chamber 110 may be colored, partially opaque or semi-transparent, patterned, and or the like. In other embodiments, the display chamber 110 may attach to and/or be integral to, the base unit 105, such as to provide stability. In yet another embodiment, the display chamber 110 may contain a sculpture or figurine in addition to, or instead of an image. In some implementations, the display chamber 110 may carry electronic identification, e.g., a passive or active Radio-Frequency Identification (RFID) tag, barcode, matrix barcode, and/or the like, which the base unit 105 may be equipped to read. This may allow computing components in the base unit 105 to detect when a particular display chamber 110 is on the top panel 120. This may trigger the base unit 105 to engage some of its functions automatically when a display chamber 110 is placed on it and/or brought into close proximity, e.g., a preprogrammed light display, music playback, other sounds, and/or the like.

Figure 7:
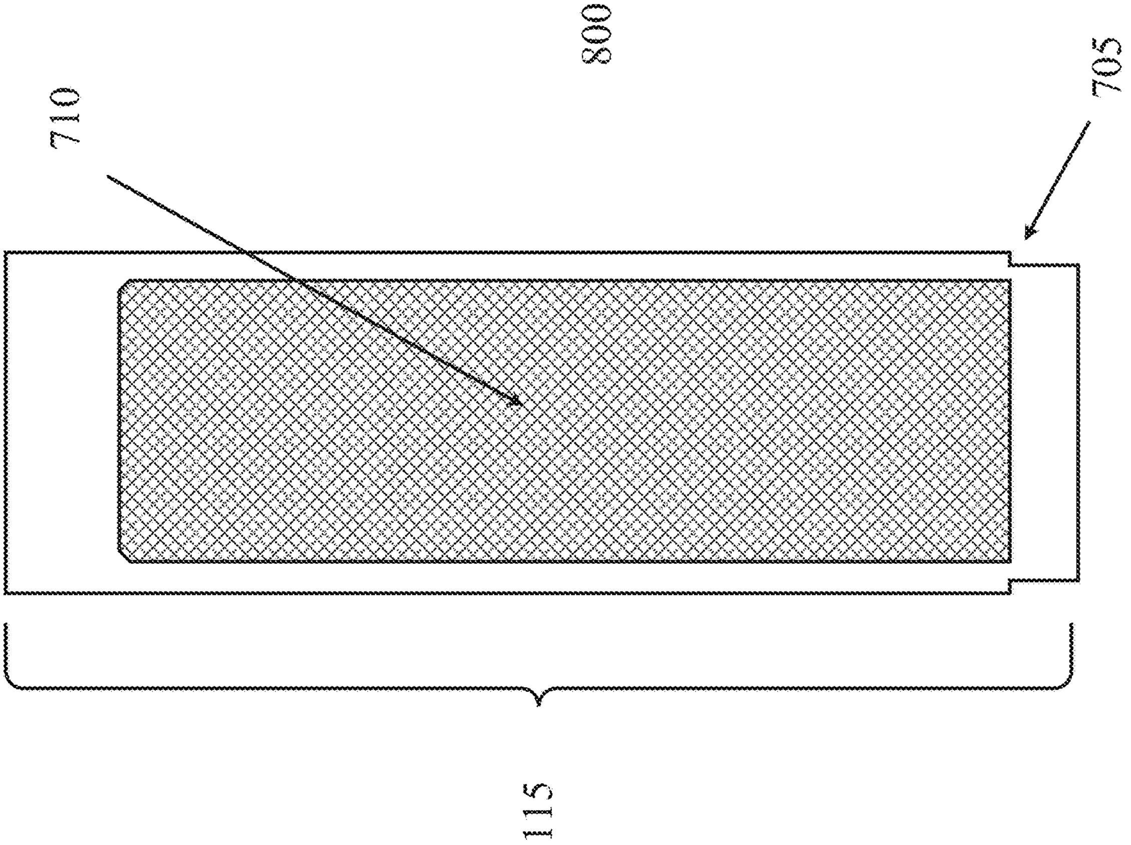
FIG. 7 depicts the front face of a light conduit comprising a light diffusing panel, according to some embodiments disclosed herein.

FIG. 7 illustrates a light conduit 115 separately in one embodiment. According to one implementation, the light conduit 115 may comprise a light-diffusing panel, such as in the shape of an elongated rectangle with the bottom portion 705 narrowed so that the light-diffusing panel may be inserted into a slot 205 in the base unit 105 up to the point that the panel narrows and thereby stand perpendicular to the base unit's 105 top panel 120. In some implementations, some or all of the light conduit 115 may include a frosted area 710. For example, a frosted area may cover most of the light-diffusing panel's area in some implementations. The frosted area 710 may be configured to provide substantially even diffuse lighting when the light-diffusing panel is lit from an edge. In some embodiments, a frosted area configured to provide even illumination may be implemented by laser etching and/or engraving in acrylic. During operation in such implementations, the light-diffusing panel may be illuminated, e.g., from its bottom edge by the light source within the base unit 105, and may redirect light from the light source to diffusely illuminate a display chamber 110. In alternative implementations, light conduits 115 in other shapes or with other optical properties can be substituted for the light-diffusing panel of the previously described implementation in order to achieve other desired illumination conditions. In some examples, the light conduit 115 may comprise one or more fiber optic cables, a series of enclosed mirrors, a lens, a device consisting of a combination of optical components, and/or the like. For example, a differently configured light conduit 115 may direct light to illuminate the display chamber 110 from the front.

Figure 8:
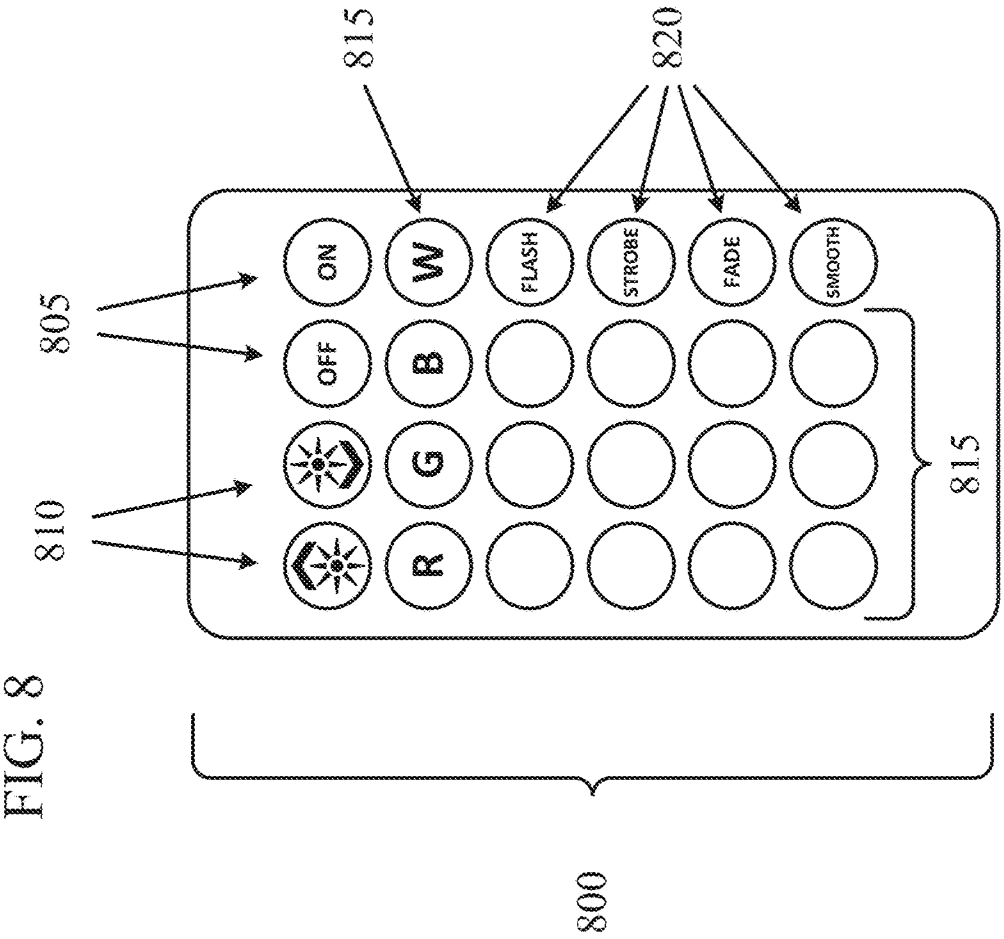
FIG. 8 depicts the front face of a remote control, according to some embodiments disclosed herein.

FIG. 8 illustrates a remote control 800 in one embodiment. In various implementations, the remote control 800 may accompany the assembled display platform 100 and serve to control its light source from a distance. For example, the remote may include buttons configured to turn the light source on and off 805, dim and brighten the light 810, change the color of the light 815, and change the mode of illumination 820 including, for example, flashing, strobing, blinking between colors, fading between colors, ultraviolet illumination, and/or the like. In implementations that have additional functions, the remote control 800 may also control such functions, for example aroma, sound effects, music playback, and/or the like. In other embodiments, the light source may be controlled in other ways and have different illumination capabilities. As already described, other embodiments may be controlled other than by remote.

In some implementations, the Novelty Display Platform may include a computer systemization such as may comprise a clock, a controller, a memory (e.g., a read only memory (ROM), a random access memory (RAM), and/or the like), and/or an interface bus, which may be interconnected and/or communicating through a system bus on one or more (mother)board(s) having conductive and/or otherwise transportive circuit pathways through which instructions (e.g., binary encoded signals) may travel to effectuate communications, operations, storage, and/or the like. The computer systemization may be connected to a power source, e.g., that is external and/or internal. The controller may serve to aggregate, processes, store, serve, identify, instruct, generate, match, and/or facilitate interactions with a user and/or computer, provide for programming of Novelty Display Platform components, and/or the like. The controller may include one or more processors, such as a central processing unit (CPU), microprocessor, microcontroller, and/or the like. In some implementations, the processor may comprise at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory beyond the processor itself, internal memory may include, but is not limited to: fast registers, various levels of cache memory (e.g., level 1, 2, 3, and/or the like), RAM, and/or the like. The processor may access this memory through the use of a memory address space that is accessible via instruction address, which the processor can construct and decode allowing it to access a circuit path to a specific memory address space having a memory state. The processor may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (e.g., program code) according to conventional data processing techniques. Such instruction passing facilitates communication within the controller and beyond through various interfaces.

Any mechanization and/or embodiment allowing a processor to affect the storage and/or retrieval of information is regarded as memory. However, memory is a fungible technology and resource, thus, any number of memory embodiments may be employed in lieu of or in concert with one another. It is to be understood that the controller and/or a computer systemization may employ various forms of memory. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory will include ROM, RAM, and a storage device. A storage device may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW and/or the like); an array of devices (e.g., Redundant Array of Independent Disks (RAID)); solid state memory devices (USB memory, solid state drives (SSD), and/or the like); other processor-readable storage mediums; and/or other devices of the like.

Interface bus(ses) may accept, connect, and/or communicate to a number of interface adapters, conventionally although not necessarily in the form of adapter cards, such as but not limited to: input output interfaces (I/O), storage interfaces, network interfaces, and/or the like. The interface bus provides for the communications of interface adapters with one another as well as with other components of the computer systemization. Interface adapters are adapted for a compatible interface bus. Interface adapters may connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces may accept, communicate, and/or connect to a number of storage devices such as, but not limited to: storage devices, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces may accept, communicate, and/or connect to a communications network. Through a communications network, the IDAP controller is accessible through remote clients (e.g., computers with web browsers) by users. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers, architectures may similarly be employed to pool, load balance, and/or otherwise increase the communicative bandwidth required by the controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces may be used to engage with various communications network types. For example, multiple network interfaces may be employed to allow for the communication over broadcast, multicast, and/or unicast networks.

Input Output interfaces (I/O) may accept, communicate, and/or connect to user input devices, peripheral devices, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, and/or the like); and/or the like.

User input devices may constitute one type of peripheral device and may include: card readers, dongles, finger print readers, gloves, graphics tablets, joysticks, keyboards, microphones, mouse (mice), remote controls, retina readers, touch screens (e.g., capacitive, resistive, and/or the like), trackballs, trackpads, sensors (e.g., accelerometers, ambient light, GPS, gyroscopes, proximity, and/or the like), styluses, and/or the like.

Peripheral devices may be connected and/or communicate to I/O and/or other facilities of the like such as network interfaces, storage interfaces, directly to the interface bus, system bus, the CPU, and/or the like. Peripheral devices may be external, internal and/or part of the IDAP controller. Peripheral devices may include: antenna, audio devices (e.g., line-in, line-out, microphone input, speakers, and/or the like), cameras (e.g., still, video, webcam, and/or the like), dongles (e.g., for copy protection, ensuring secure transactions with a digital signature, and/or the like), external processors (e.g., for added capabilities), network interfaces, storage devices, transceivers (e.g., cellular, GPS, and/or the like), and/or the like.

It should be noted that although user input devices and peripheral devices may be employed, the controller may be embodied as an embedded, dedicated, and/or monitor-less (e.g., headless) device, wherein access would be provided over a network interface connection.

In order to address various issues and advance the art, the entirety of this application for a Novelty Display Platform (including the Cover Page, Title, Headings, Field, Background, Summary, Brief Description of the Drawings, Detailed Description, Claims, Abstract, Figures, Appendices, and/or otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any components and/or any present feature sets as described in the figures and/or throughout are not limited to a fixed order and/or arrangement, but rather, any disclosed order is exemplary and all equivalents, regardless of order, are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims.

What is claimed is:

1. An apparatus, comprising:

a base unit including a light source enclosed within the base unit, an opening at a top side of the base unit, and a display chamber stage adjacent to the opening;

a light conduit;

wherein the display chamber stage is configured to accommodate a display chamber, and wherein the opening is configured to accommodate the light conduit for directing light from the light source to illuminate the display chamber.

2. The apparatus of claim 1, further comprising the display chamber.

3. The apparatus of claim 2, wherein the display chamber is transparent.

4. The apparatus of claim 3, wherein the display chamber comprises plastic.

5. The apparatus of claim 3, wherein the display chamber comprises glass.

6. The apparatus of claim 2, wherein the display chamber contains an aqueous mixture.

7. The apparatus of claim 6, wherein the display chamber contains a particulate suspension in said aqueous mixture.

8. The apparatus of claim 6, wherein the aqueous mixture includes a thickening agent.

9. The apparatus of claim 8, wherein the thickening agent is polyvinyl alcohol.

10. The apparatus of claim 2, wherein the display chamber contains a transparent sheet with an image thereon.

11. The apparatus of claim 2, wherein the display chamber includes an image on an interior surface of the display chamber.

12. The apparatus of claim 1, wherein the light conduit is acrylic.

13. The apparatus of claim 1, wherein the light conduit comprises a light-diffusing panel.

14. The apparatus of claim 13, wherein the light-diffusing panel includes a frosted region.

15. The apparatus of claim 14, wherein the frosted region is configured to provide diffuse illumination when the light diffusing panel is illuminated from an edge.

16. The apparatus of claim 1 wherein the light source is a color-changing light source.

17. The apparatus of claim 1 further comprising a remote control configured to control the light source.

18. The apparatus of claim 17, wherein the remote control is configured to change a color of the light source.

19. The apparatus of claim 17, wherein the remote control is configured to change a brightness of the light source.

* * * * *